(12) United States Patent
Marcantoni

(10) Patent No.: US 9,590,465 B2
(45) Date of Patent: Mar. 7, 2017

(54) DRIVE SYSTEM HAVING A LINEAR ACTUATOR AND ITEM OF FURNITURE HAVING SUCH A DRIVE SYSTEM

(71) Applicant: CIAR S.P.A., Pesaro (IT)

(72) Inventor: Egidio Marcantoni, Pesaro (IT)

(73) Assignee: Ciar S.P.A. (IT)

( * ) Notice: Subject to any disclaimer, the term of this patent is extended or adjusted under 35 U.S.C. 154(b) by 360 days.

(21) Appl. No.: 13/960,087

(22) Filed: Aug. 6, 2013

(65) Prior Publication Data
US 2014/0035395 A1 Feb. 6, 2014

(30) Foreign Application Priority Data
Aug. 6, 2012 (DE) .................... 20 2012 102 949 U

(51) Int. Cl.
| | |
|---|---|
| *H02K 7/00* | (2006.01) |
| *A47C 20/04* | (2006.01) |
| *A47C 1/024* | (2006.01) |
| *A47C 1/032* | (2006.01) |

(52) U.S. Cl.
CPC ............. *H02K 7/00* (2013.01); *A47C 20/041* (2013.01); *A47C 1/0242* (2013.01); *A47C 1/0246* (2013.01); *A47C 1/03211* (2013.01); *A47C 1/03222* (2013.01)

(58) Field of Classification Search
None
See application file for complete search history.

(56) References Cited

U.S. PATENT DOCUMENTS

| | | | | |
|---|---|---|---|---|
| 4,693,128 A | * | 9/1987 | Plow | F16H 25/20 74/104 |
| 4,852,939 A | * | 8/1989 | Krauska | 297/71 |
| 5,167,803 A | * | 12/1992 | Newton | B01D 29/01 210/141 |
| 5,315,726 A | * | 5/1994 | Borenstein | 5/618 |
| 5,542,744 A | * | 8/1996 | Bathrick | 297/362.11 |
| 5,577,280 A | * | 11/1996 | Elliott | A47C 19/005 5/617 |
| 5,944,486 A | * | 8/1999 | Hodgkins, Jr. | 416/210 R |

(Continued)

FOREIGN PATENT DOCUMENTS

| | | |
|---|---|---|
| DE | 1404673 A | 7/1969 |
| DE | 10046751 A1 | 7/2001 |

(Continued)

*Primary Examiner* — David E Allred
(74) *Attorney, Agent, or Firm* — Renner Kenner Greive Bobak Taylor & Weber

(57) ABSTRACT

A drive system includes a linear actuator for transmitting a linear movement, the linear actuator having a spindle and a nut which co-operates therewith and an electric motor for driving the spindle. The drive system has a fixed frame and at least one frame movable relative thereto, the linear actuator secured to the fixed frame and the movable frame being coupled to the nut in an articulated manner by at least one actuation rod. Movement of the nut along the spindle brings about a movement of the movable frame relative to the fixed frame. The nut further has at least one stud and the actuation rod is provided with a corresponding recess for fitting the actuation rod onto the stud, or vice versa, and the fitted actuation rod is secured to the stud by a securing element, in particular a clip.

16 Claims, 7 Drawing Sheets

(56) References Cited

U.S. PATENT DOCUMENTS

| | | | |
|---|---|---|---|
| 6,300,732 B1 * | 10/2001 | Brambilla | 318/9 |
| 6,687,932 B1 * | 2/2004 | Bangert et al. | 5/617 |
| 6,763,536 B2 * | 7/2004 | Dewert | 5/618 |
| 6,961,971 B2 * | 11/2005 | Schneider et al. | 5/618 |
| 7,140,682 B2 * | 11/2006 | Jaeger et al. | 297/330 |
| RE43,629 E * | 9/2012 | Wu | 403/315 |
| 2002/0036421 A1 * | 3/2002 | Bangert | 297/316 |
| 2004/0219023 A1 * | 11/2004 | Bird et al. | 416/210 R |
| 2005/0251917 A1 * | 11/2005 | Wall | 5/618 |
| 2007/0285035 A1 * | 12/2007 | Roither et al. | 318/120 |
| 2008/0271246 A1 * | 11/2008 | Nielsen et al. | 5/616 |
| 2009/0044340 A1 * | 2/2009 | Nielsen | 5/618 |
| 2009/0094748 A1 * | 4/2009 | Long | A47C 20/08 5/613 |
| 2010/0178134 A1 * | 7/2010 | Dimoff | B66F 3/08 414/10 |
| 2010/0224017 A1 * | 9/2010 | Nielsen | 74/89.23 |
| 2013/0327007 A1 * | 12/2013 | Eavenson et al. | 56/295 |
| 2014/0125102 A1 * | 5/2014 | McMillen | B60N 2/66 297/284.4 |
| 2014/0239679 A1 * | 8/2014 | Griggs, Jr. | 297/183.1 |
| 2014/0366267 A1 * | 12/2014 | Suh | 5/174 |
| 2016/0208520 A1 * | 7/2016 | Jordan | E05B 65/46 |

FOREIGN PATENT DOCUMENTS

| | | |
|---|---|---|
| DE | 20211072 U1 | 1/2004 |
| EP | 1384422 B1 | 4/2004 |

* cited by examiner

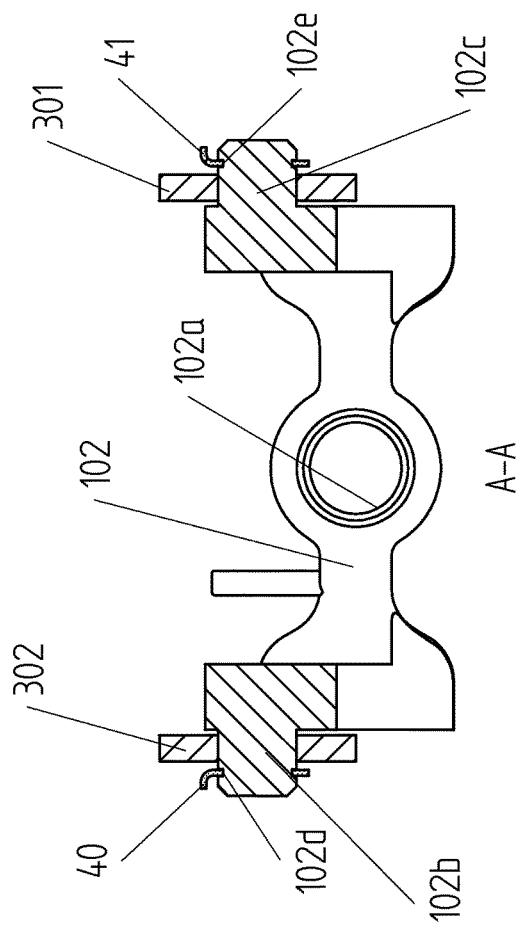
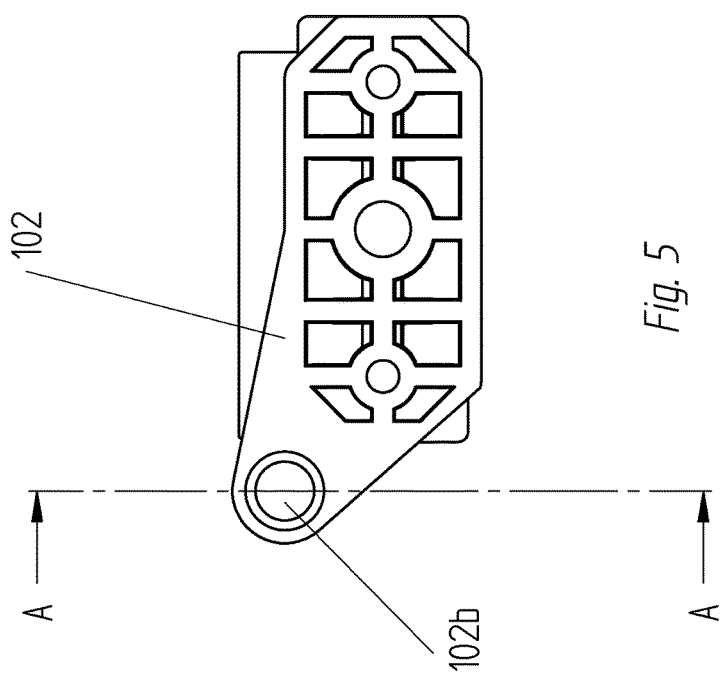

DRIVE SYSTEM HAVING A LINEAR ACTUATOR AND ITEM OF FURNITURE HAVING SUCH A DRIVE SYSTEM

CROSS REFERENCE TO RELATED APPLICATION

The present filing claims the benefit of German Patent Application No. 20 2012 102 949.9, filed Aug. 6, 2012.

TECHNICAL FIELD

The invention relates to a drive system having a linear actuator for transmitting a linear movement and a frame for securing the linear actuator, the linear actuator having a spindle and a nut which co-operates therewith and an electric motor for driving the spindle. The invention further relates to an item of furniture having such a drive system, this being able to be, for example, an item of furniture for use in the seated or reclined position.

BACKGROUND OF THE INVENTION

From EP 1 384 422 B1, there is known an item of seating furniture having a seat and a backrest which are retained in an articulated manner on a frame, an actuation mechanism which is constructed as a linear actuator being provided for adjusting the inclination of the seat and backrest. The linear actuator is conventionally screwed to a frame of the item of furniture. In this instance, the assembly region is often only accessible with difficulty with the result that the assembly of the linear actuator involves considerable complexity. Replacement of a defective linear actuator which may be necessary at a later time is also difficult in most cases.

SUMMARY OF THE INVENTION

An object of the invention is therefore to simplify the assembly of the linear actuator.

This object is achieved according to the invention by the features of claim 1.

The drive system according to the invention substantially comprises
- a linear actuator for transmitting a linear movement which has a spindle and a nut which co-operates therewith and an electric motor for driving the spindle, and
- a fixed frame and at least one frame which can be moved relative thereto,
- the linear actuator being secured to the fixed frame and the movable frame being coupled to the nut in an articulated manner by means of at least one actuation rod, a movement of the nut along the spindle bringing about a movement of the movable frame relative to the fixed frame.

The nut further has at least one stud and the actuation rod is provided with a corresponding recess for fitting the actuation rod onto the stud, or the other way round, and wherein the fitted actuation rod being secured to the stud by means of a securing element, in particular a clip.

The actuation rod can consequently be coupled to the nut in a simple manner and thereby considerably simplifies the assembly.

The subsidiary claims relate to other embodiments of the invention.

The nut has, preferably at two opposing sides, a stud, each of which co-operates with an actuation rod. It is thereby possible to prevent twisting of the nut on the spindle owing to a single-sided load. According to another embodiment, the nut and the at least one stud are constructed as a plastics injection-moulded component. In order to receive the securing element, a peripheral groove is provided on the stud in one embodiment of the invention. The groove is arranged and constructed in such a manner that it receives the securing element, in particular a clip, and prevents removal of the fitted actuation rod.

According to another embodiment of the invention, there are provided at a first end of the linear actuator first securing means which co-operate with second securing means on the fixed frame and, at a second end of the linear actuator, there are provided third securing means which co-operate with fourth securing means on the fixed frame. The first and second securing means and the third and fourth securing means can be moved by means of a displacement of the linear actuator relative to the fixed frame in the longitudinal direction of the spindle between a release position and a locking position, there further being provided a releasable locking element which blocks a relative movement of the linear actuator relative to the fixed frame in the locking position.

The linear actuator therefore no longer has to be secured to the frame with individual screws in an awkward manner, but instead, by means of simple displacement, can be moved into a locking position in which the linear actuator then only has to be secured. In this manner, the assembly or replacement of a potentially defective linear actuator can further be simplified and accelerated.

In one embodiment of the invention, the first end of the linear actuator is closed with a closure cap, the first securing means being arranged on this closure cap. Furthermore, the electric motor may be provided at the second end of the linear actuator and may have a housing, the third securing means being arranged on the housing of the electric motor.

According to a first embodiment of the invention, the first and second securing means are constructed in the form of a keyhole connection, the first or second securing means having at least one keyhole recess and the other securing means providing for at least one stud which co-operates with the keyhole recess.

According to a second embodiment of the invention, the first and second securing means form a type of hook and eye connection. In this instance, the first or second securing means may be formed by at least one hook and the other securing means by an eye which co-operates with the hook.

The locking element may be formed, for example, by means of a bolt or pin which co-operates with corresponding holes which are in alignment in the locking position in the third and fourth securing means. The locking element may in this instance also be secured by means of a securing element, in particular a clip.

According to a preferred embodiment of the invention, at least the first and second and/or third and fourth actuation element is constructed for securing the linear actuator to the fixed frame in a tool-free manner.

BRIEF DESCRIPTION OF THE DRAWINGS

Other advantages and embodiments of the invention will be explained in greater detail below with reference to the description of two embodiments and the drawings, in which:

FIG. 5 is a side view of the nut, FIG. 6 is a sectioned illustration of the nut with the fitted actuation rod along the line A-A in FIG. 5.

DETAILED DESCRIPTION OF ILLUSTRATIVE EMBODIMENTS

Figure 1:
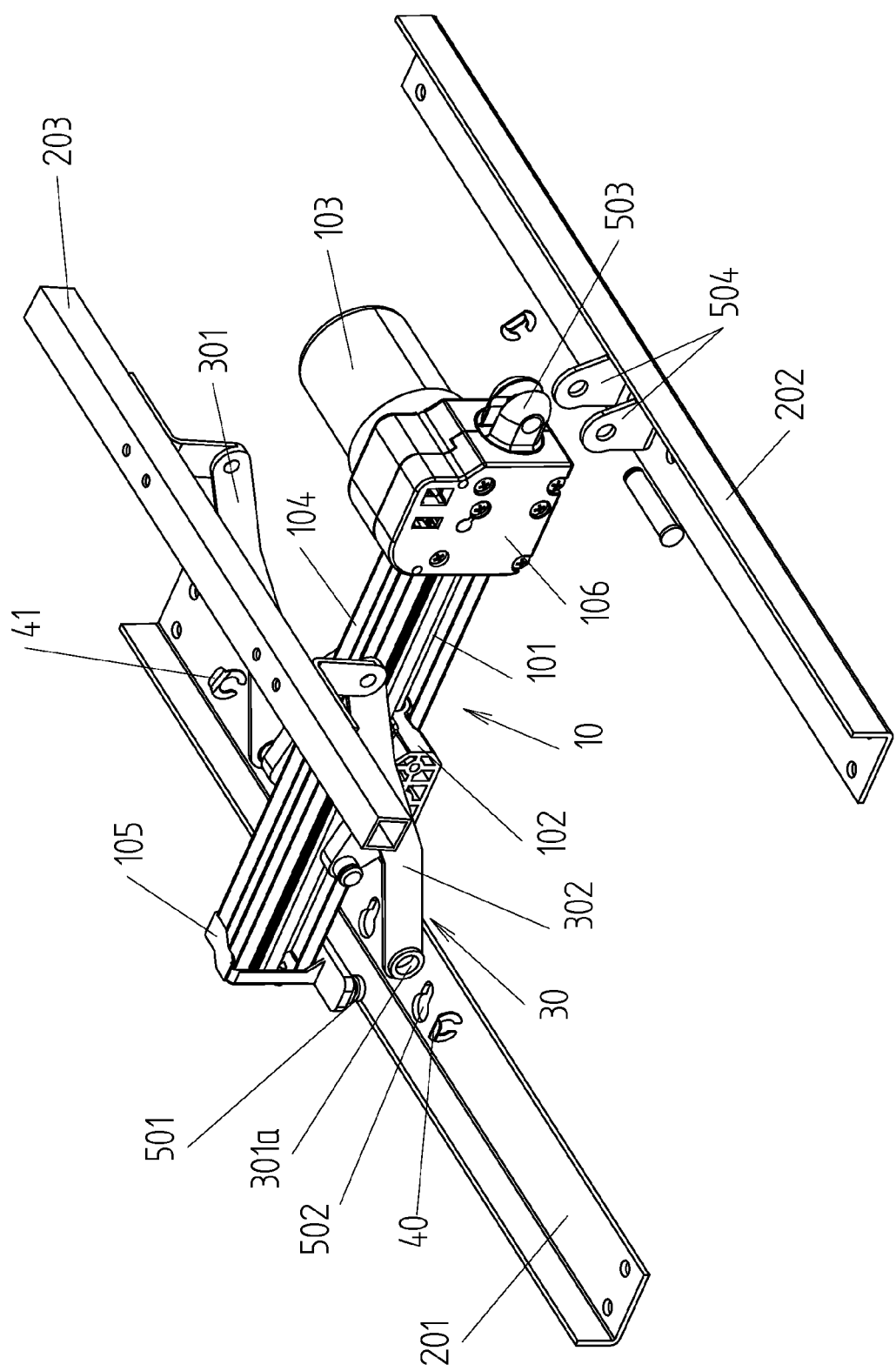
FIG. 1 is a three-dimensional exploded view of the drive system according to a first embodiment.

The drive system illustrated in FIG. 1 substantially comprises a linear actuator 10 for transmitting a linear movement and a fixed frame (fixed frame portions 201, 202), to which the linear actuator is secured and a movable frame 203, which is retained, for example, in an articulated manner on the fixed frame and coupled to the linear actuator.

The linear actuator 10 has a spindle 101, a nut 102 which co-operates therewith and an electric motor 103 for driving the spindle. The nut 102 is guided along the spindle 101 in a guide rail 104 which is closed at the end thereof with a closure cap 105. At the other end, there is provided the electric motor which, together with a gear mechanism for transmitting the motor rotational movement to the spindle, is accommodated in a housing 106.

Figure 2:
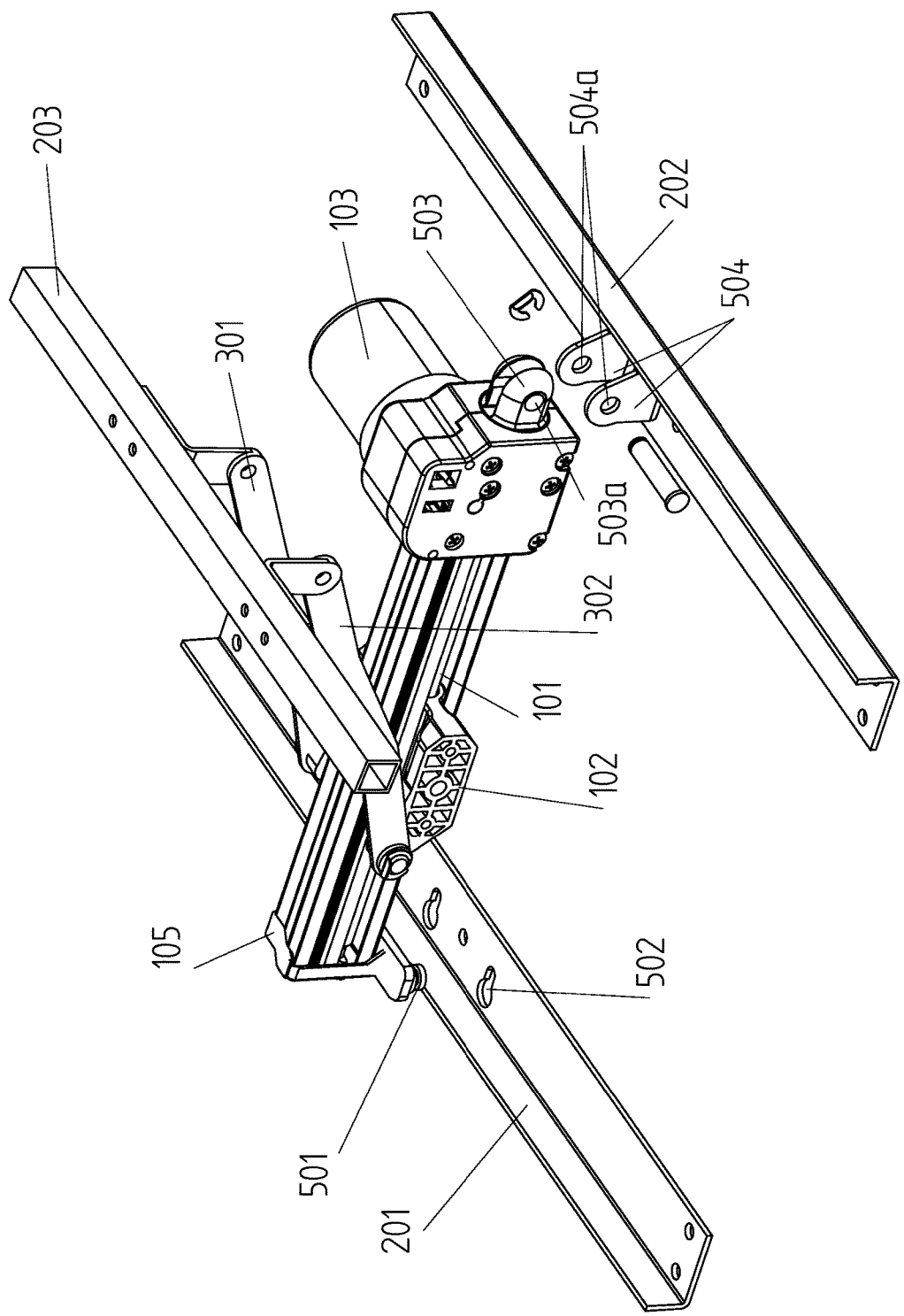
FIG. 2 is a three-dimensional illustration of the first embodiment with the actuation rod coupled.
Figure 4:
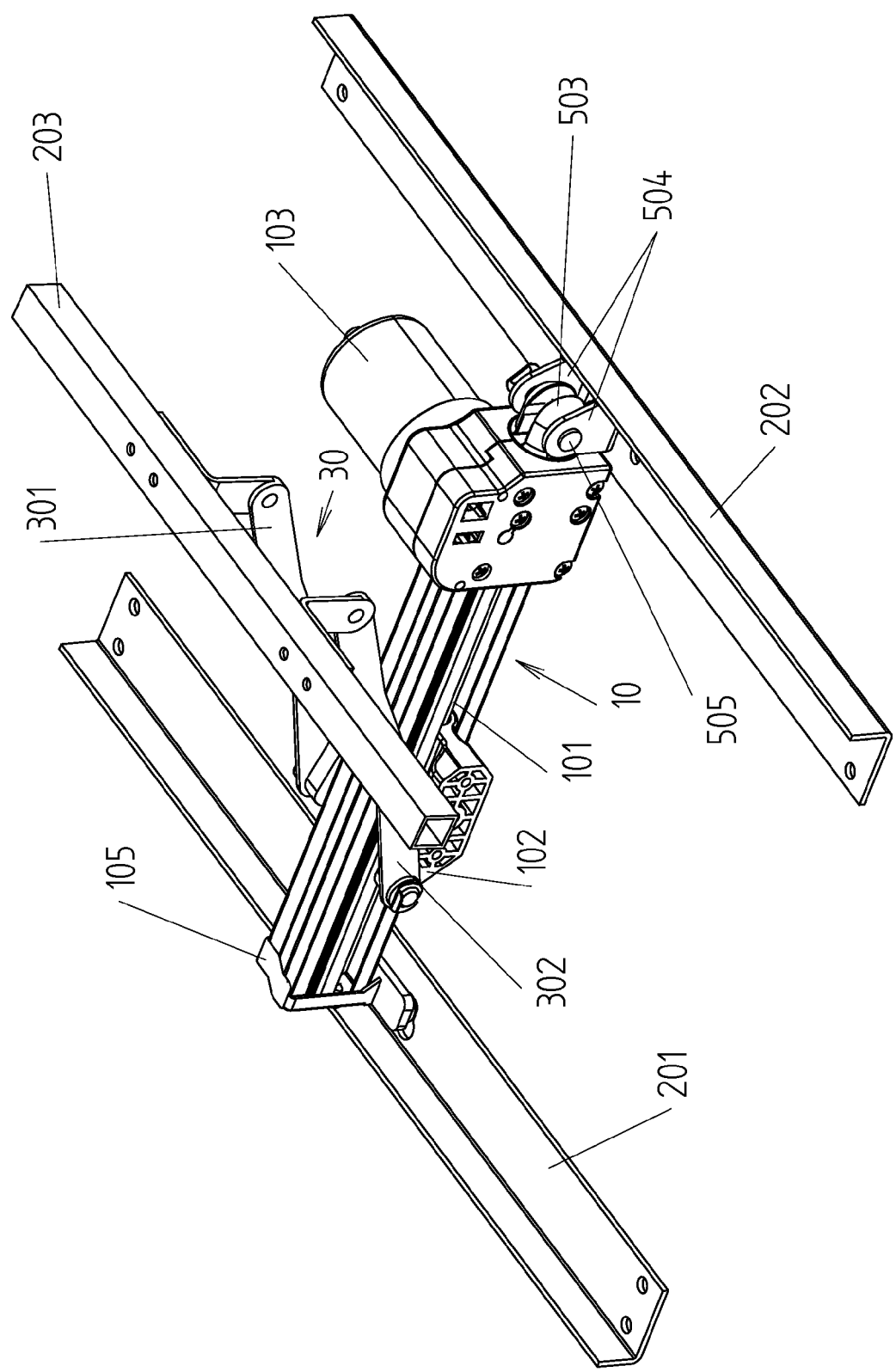
FIG. 4 is a three-dimensional illustration of the first embodiment, the linear actuator being located in the locking position on the frame.

In the assembled state according to FIG. 4, the linear actuator 10 is fixed between the two fixed frame portions 201 and 202 and connected to the movable frame portion 203 by means of an actuation rod 30. The actuation rod 30 is formed in the embodiment illustrated by two parallel joint rods 301, 302 which are coupled at one end in an articulated manner to the movable frame portion 203 and at the other end in an articulated manner to the nut 102 (see FIG. 2).

The nut 102 is illustrated in greater detail in FIGS. 5 and 6. It has a threaded hole 102a for receiving the spindle 101 and, at opposing sides, a stud 102b, 102c, respectively. The nut 102 and the studs 102b, 102c are preferably constructed in one piece as a plastics injection-moulded component. The joint rods 301, 302 of the actuation rod are provided with corresponding recesses 301a and 302a for fitting the actuation rod to the studs 102b, 102c, the fitted joint rods 301, 302 each being secured to the stud by means of a securing element 40, 41, in particular a clip. To this end, the studs have peripheral grooves 102d, 102e for receiving the securing elements 40, 41. The joint rods 301, 302 are thus retained on the stud in an articulated manner.

The movable frame 203 is connected in an articulated manner to the fixed frame portions 201 and 202 in a manner not shown in greater detail here so that a movement of the nut 102 along the spindle 101 brings about a relative movement of the movable frame 203 with respect to the fixed frame portions 201 and 202 via the actuation rod 30.

The securing of the linear actuator 10 to the two fixed frame portions 201 and 202 is carried out by means of first to fourth securing means 501 to 504. To this end, there are provided in the region of the closure cap 5 first securing means 501 which co-operate with second securing means 502 on the fixed frame portion 201. The third securing means 503 is formed by a projection of the housing 106 which co-operates with fourth securing means which are formed by two flaps and which receive the projection between them. Both the third securing means 503 and the fourth securing means 504 have holes 503a, 504a which are in alignment with each other in the locking position according to FIG. 4 so that a locking element 505, for example, a bolt or a pin can be inserted.

The first and second securing means 501, 502 are constructed in the form of a keyhole connection, the second securing means 502 being formed, for example, by means of a keyhole recess and the first securing means by means of a stud which co-operates therewith.

Figure 3:
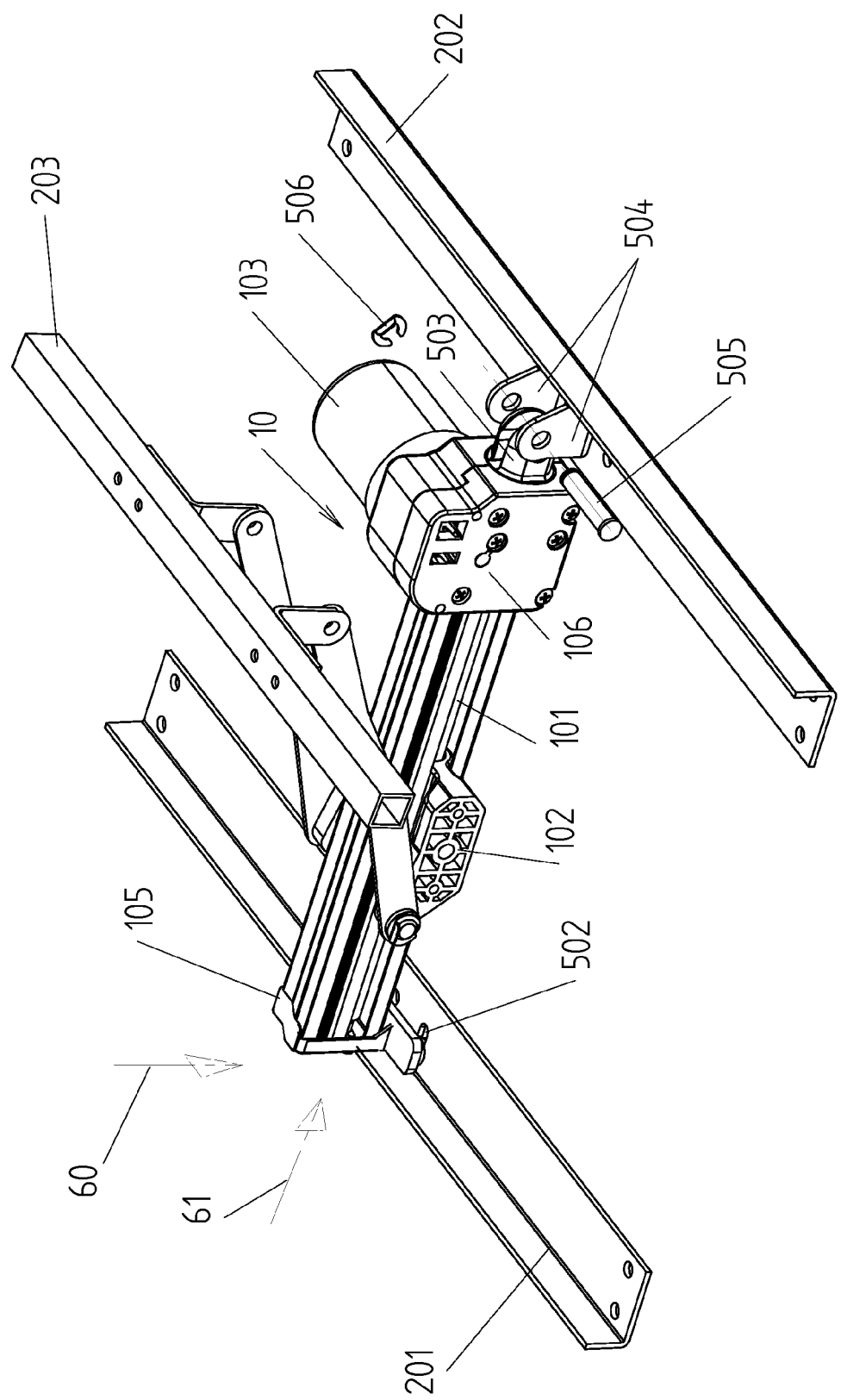
FIG. 3 is a three-dimensional illustration of the first embodiment, the linear actuator being located in the release position on the frame.

In order to secure the linear actuator 10 to the fixed frame, the linear actuator is first inserted with its first securing means 501 from above (arrow 60) into the second securing means 502 on the fixed frame portion 201, the third securing means 503 which is constructed as a projection at the same time arriving between the flaps of the fourth securing means 504 (see FIG. 3). Subsequently, there is a displacement of the linear actuator 10 relative to the fixed frame in the direction of the arrow 61. In this instance, the first securing means which is constructed as a stud arrives in the narrowed region of the second securing element which is constructed as a keyhole recess, the stud of the first securing means 501 having a groove which, in this position of the two securing means, prevents a movement of the linear actuator counter to the arrow 60. At the same time, the holes of the third and fourth securing means 503, 504 assume an aligned orientation so that the locking element 505 can be inserted and secured by means of a securing element 506, in particular a clip.

The first and second securing means 501, 502 and the third and fourth securing means 503, 504 can consequently be moved by means of a displacement of the linear actuator 10 relative to the fixed frame in the longitudinal direction of the spindle 101 between the release position illustrated in FIG. 3 and the locking position illustrated in FIG. 4. The releasable locking element 505 blocks in the locking position according to FIG. 4 a relative displacement of the linear actuator 10 relative to the fixed frame. The securing means 501 to 504 described above allow tool-free securing of the linear actuator 10 to the fixed frame. The assembly and any replacement of the linear actuator which may be necessary is thereby considerably simplified.

Figure 7:
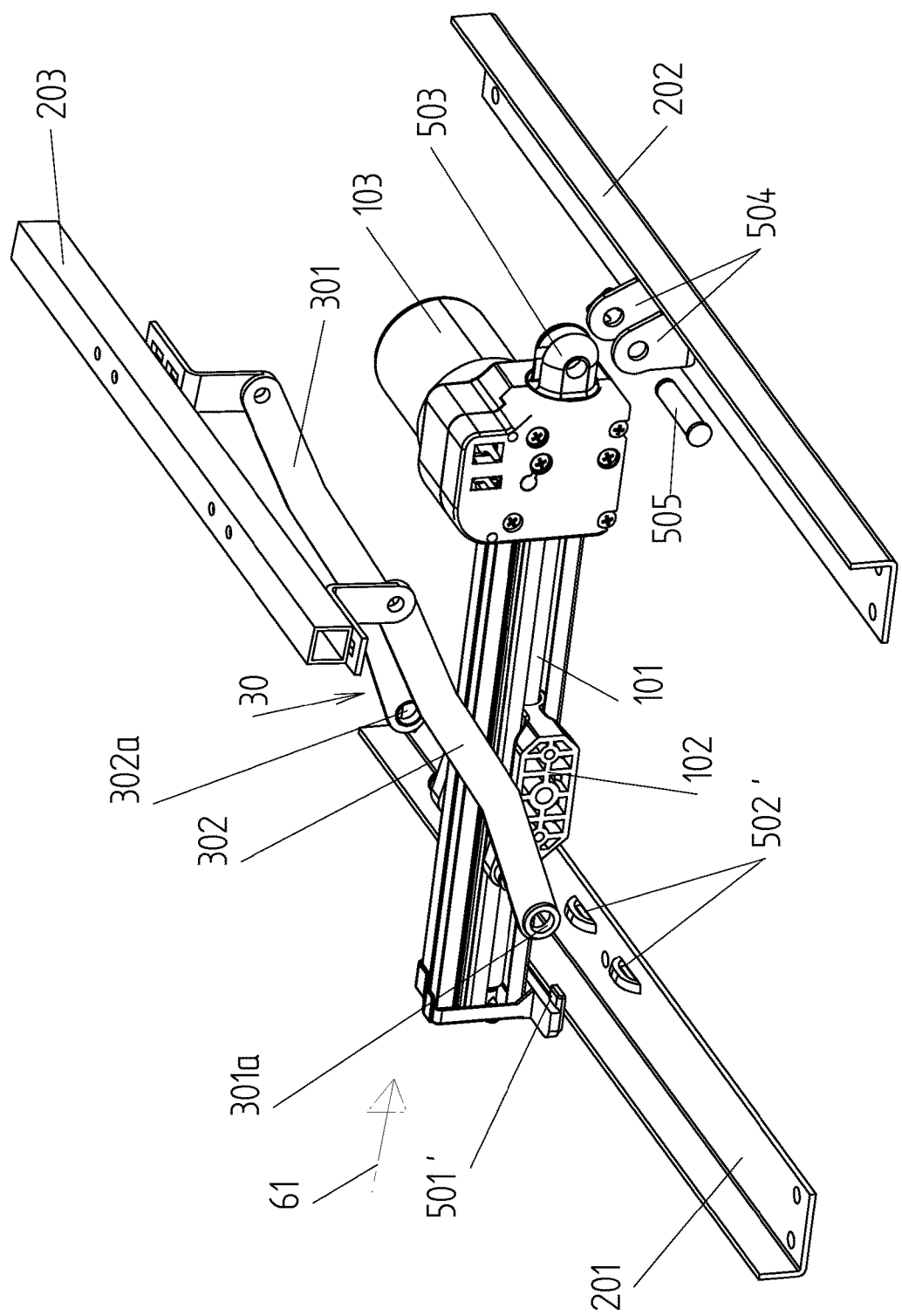
FIG. 7 is a three-dimensional exploded view of the drive system according to a second embodiment.
Figure 8:
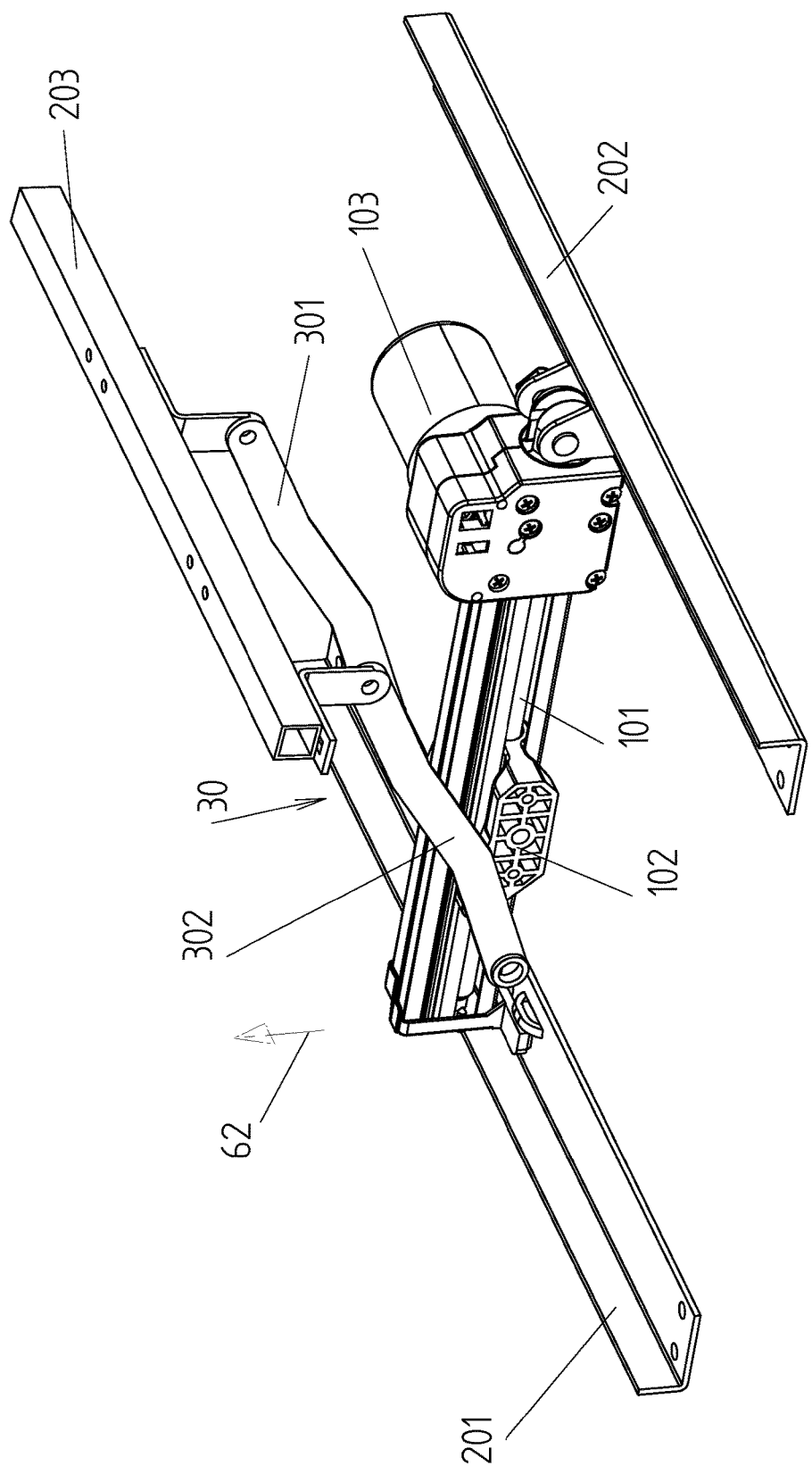
FIG. 8 is a three-dimensional illustration of the second embodiment, the linear actuator being located in the locking position on the frame.

In FIGS. 7 and 8, a second embodiment of the invention is illustrated, but which differs only owing to the configuration of the first and second securing means 501', 502'. In this embodiment, the connection is not constructed in the manner of a keyhole connection, but instead in the manner of a hook and eye connection. To this end, the first securing means 501' is constructed, for example, as a hook and the second securing means 502' as an eye, the hook being pushed when the linear actuator 61 is displaced in the direction of the arrow 61 into the eye and the linear actuator thereby no longer being able to move in the direction of the arrow 62 (FIG. 8). The third and fourth securing means 503, 504 correspond to the corresponding securing means from the first embodiment. The connection of the actuation rod 30 to the nut 102 is also carried out in a corresponding manner.

The above drive system may be provided in particular for an item of furniture, for example, for an item of furniture for use in the seated or reclined position, which is provided with at least one movable element (for example, a backrest of a seat or a head or foot portion of an item of reclining furniture). The movable element is then fitted to the movable frame 203 whilst the linear motor is provided on the fixed frame of the item of furniture.

The invention claimed is:

1. Drive system having
a linear actuator for transmitting a linear movement, the linear actuator including:
a spindle,
a nut cooperating with the spindle,
an electric motor for driving the spindle,
a first securing means at a first end of the linear actuator, and
a third securing means at a second end of the linear actuator;
a fixed frame including a second securing means and fourth securing means;
at least one movable frame coupled to the nut in an articulated manner by means of at least one actuation rod, such that movement of the nut along the spindle causes movement of the movable frame relative to the fixed frame, wherein either (a) the nut has at least one stud and the actuation rod is provided with a corresponding recess for fitting the actuation rod onto the stud or (b) the actuation rod has at least one stud and the nut is provided with a corresponding recess for fitting the stud onto the actuation rod, wherein a securing element secures the actuation rod and stud together; and
a locking element,
wherein the linear actuator is releasable secured to the fixed frame so as to be movable between a mounted position and a dismounted position, and wherein, in the mounted position:
the first securing means of the linear actuator engages the second securing means of the fixed frame, and
the locking element secures the third securing means of the linear actuator to the fourth securing means of the fixed frame by selectively engaging and disengaging the third securing means and fourth securing means,
and the first securing means, the second securing means, the third securing means, the fourth securing means, and the locking element are structured such that, upon disengaging of locking element with the third securing means and fourth securing means, displacement of the linear actuator relative to the fixed frame in a longitudinal direction of the spindle disengages the first securing means from the second securing means and thus moves the linear actuator to its dismounted position.

2. Drive system according to claim 1, characterized in that the nut has, at two opposing sides, a stud, each of which cooperates with an actuation rod.

3. Drive system according to claim 1, characterized in that the nut and the at least one stud are constructed as a plastics injection-moulded component.

4. Drive system according to claim 1, characterized in that the at least one stud is provided with a peripheral groove for receiving the securing element.

5. Drive system according to claim 1, characterized in that the first end of the linear actuator is closed with a closure cap and the first securing means are arranged on this closure cap.

6. Drive system according to claim 1, characterized in that the electric motor has a housing and is provided at the second end of the linear actuator, the third securing means being arranged on the housing.

7. Drive system according to claim 1, characterized in that the first and second securing means are constructed in the form of a hook and eye connection.

8. Drive system according to claim 1, characterized in that one of the first or second securing means is formed by at least one hook and the other of the first or second securing means is formed by an eye which co-operates with the hook.

9. Drive system according to any one of claim 1, characterized in that the first and second securing means are constructed in the form of a keyhole connection.

10. Drive system according to claim 1, characterized in that the first or second securing means has at least one keyhole recess and the other of the first or second securing means provides for at least one stud which co-operates with the keyhole recess.

11. Drive system according to claim 1, characterized in that the locking element is formed by a bolt or pin which, in the mounted position, cooperates with corresponding aligned holes in the third and fourth securing means.

12. Drive system according to claim 1, characterized in that the locking element is secured in selective engagement with the third securing means and fourth securing means by a lock securing element.

13. Drive system according to claim 1, characterized in that at least the first and second and/or the third and fourth securing means is constructed to secure the linear actuator to the fixed frame in a tool-free manner.

14. Drive system according to claim 1, characterized in that the actuation rod can be coupled to the nut in a tool-free manner.

15. Drive system according to claim 1, wherein the securing element is a clip.

16. Item of furniture having at least one movable element and a drive system according to claim 1, the movable element comprising the movable frame.

* * * * *